Figure 1:
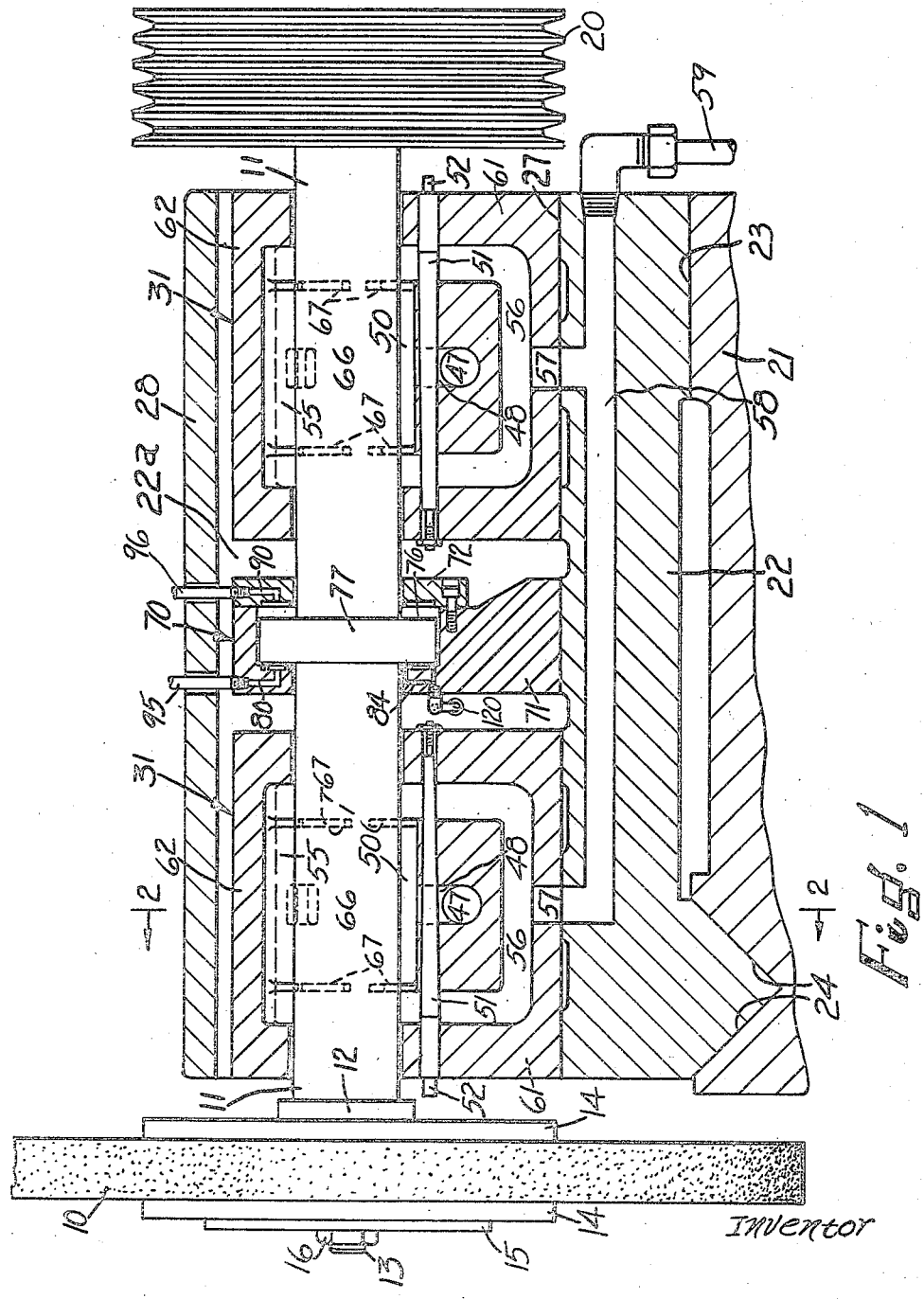

Dec. 8, 1953     G. CROMPTON, JR     2,661,580
HYDRAULIC THRUST BEARING AND RECIPROCATOR FOR SHAFTS
Filed Oct. 5, 1950     4 Sheets-Sheet 1

INVENTOR

Patented Dec. 8, 1953

2,661,580

UNITED STATES PATENT OFFICE 2,661,580

HYDRAULIC THRUST BEARING AND RECIPROCATOR FOR SHAFTS

George Crompton, Jr., Framingham Centre, Mass., assignor to Norton Company, Worcester, Mass., a corporation of Massachusetts Application October 5, 1950, Serial No. 188,632

10 Claims. (Cl. 51—34)

The invention relates to hydraulic thrust bearings and reciprocators for shafts and especially in combination with hydraulic journal bearings for supporting rotating shafts, and with regard to its more specific features for supporting, holdings and reciprocating a spindle of a machine tool such as the grinding wheel spindle of a grinding machine, and the word hydraulic is used in the engineering sense to include any liquid, especially oil, as the actuating fluid as well as water, but excluding air and other gases.

One object of the invention is to provide an hydraulic reciprocator for use with hydraulic journal bearings of the type disclosed in Italian Patent No. 244,539 to Brune Pietro of Bologna, Italy, dated January 30, 1926. Another object is to reciprocate a shaft by hydraulic pressure without contacting the shaft or anything attached to it by or with any mechanical device. Another object is to reciprocate a shaft merely by hydraulic pressure on the shaft or something integral with it or rigidly connected to it as distinguished from the use of cams, thrust bearings, yokes or other mechanical means. Another object is to hold a shaft endwise by hydraulic pressure without the intervention of mechanical means and to reciprocate it whenever desired by hydraulic pressure without the intervention of mechanical means. Another object is to achieve one or more of the foregoing objects while supporting the shaft radially solely by hydraulic pressure.

Another object is to support and hold a shaft against endwise movement solely by hydraulic pressure. Another object is to provide an hydraulic thrust bearing for a shaft which is rotatably supported and further to provide hydraulic means having no mechanical pressure on the shaft for reciprocating the shaft at will. Another object is to provide means for the following: to position a shaft radially so that its axis shall not move, to position the shaft against thrust along the axis, to permit the shaft to revolve freely, all without any mechanical pressure on any part of the shaft so far as the means are concerned. Another object is to achieve the next preceding object and further to provide means for reciprocating the shaft when desired, also without any mechanical pressure on any part of the shaft so far as the means are concerned.

Another object is to provide purely hydraulic journal bearings, a purely hydraulic thrust bearing, and a purely hydraulic reciprocator for a spindle or shaft. Another object is to hold a shaft on a fixed axis for rotation and in a fixed position in the direction of the axis and optionally to reciprocate the spindle along the axis while it is rotating, and to achieve the foregoing with such precision that the shaft may be the wheel spindle of a grinding machine and the grinding machine will grind with precision, accomplishing all of the above with little or no wear on the spindle or its "bearings."

Other objects will be in part obvious or in part pointed out hereinafter. The invention accordingly consists in the features of construction, combinations of elements, and arrangements of parts as will be exemplified in the structure to be hereinafter described, and the scope of the application of which will be indicated in the following claims.

Figure 2:
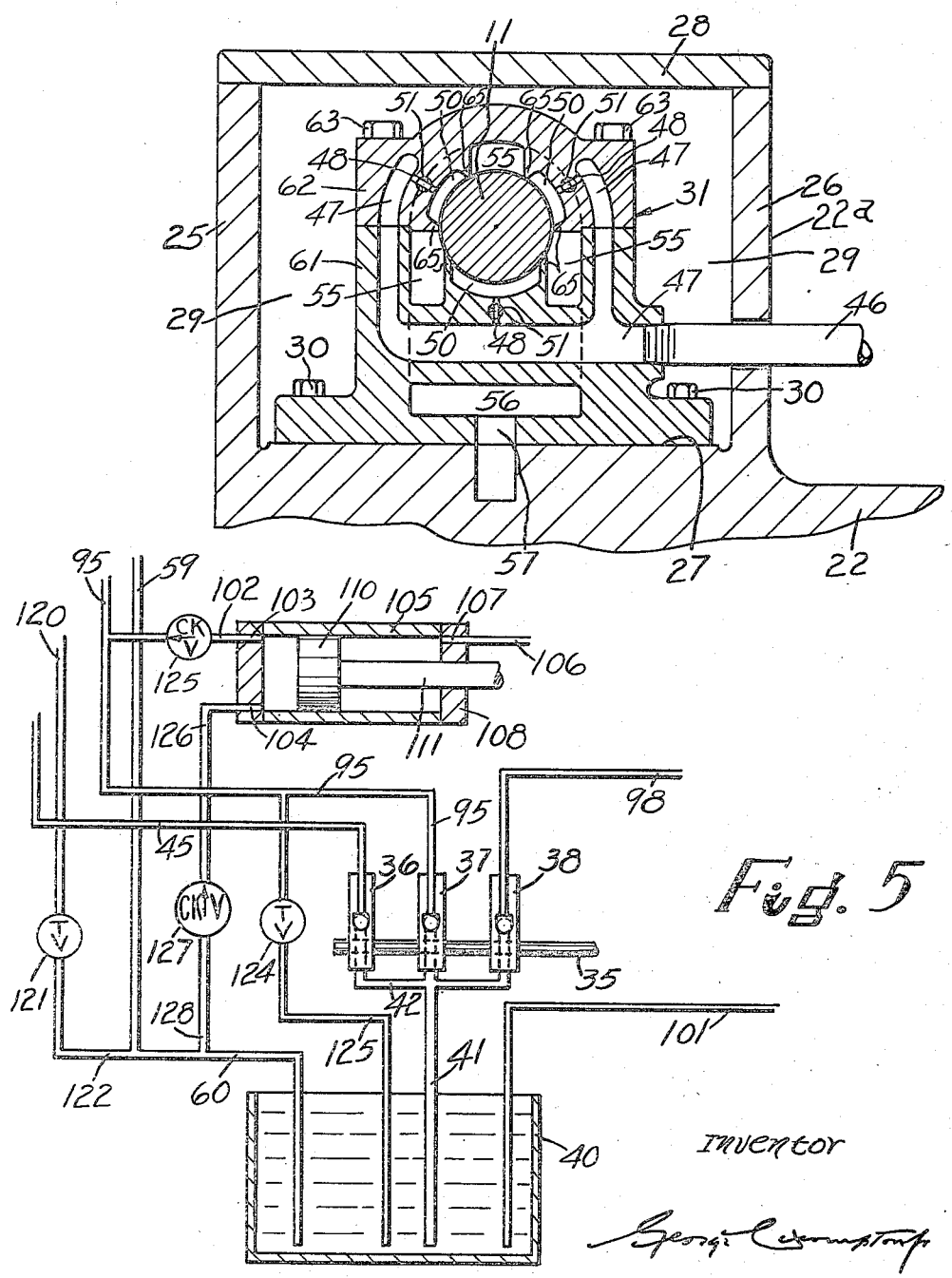
Figure 3:
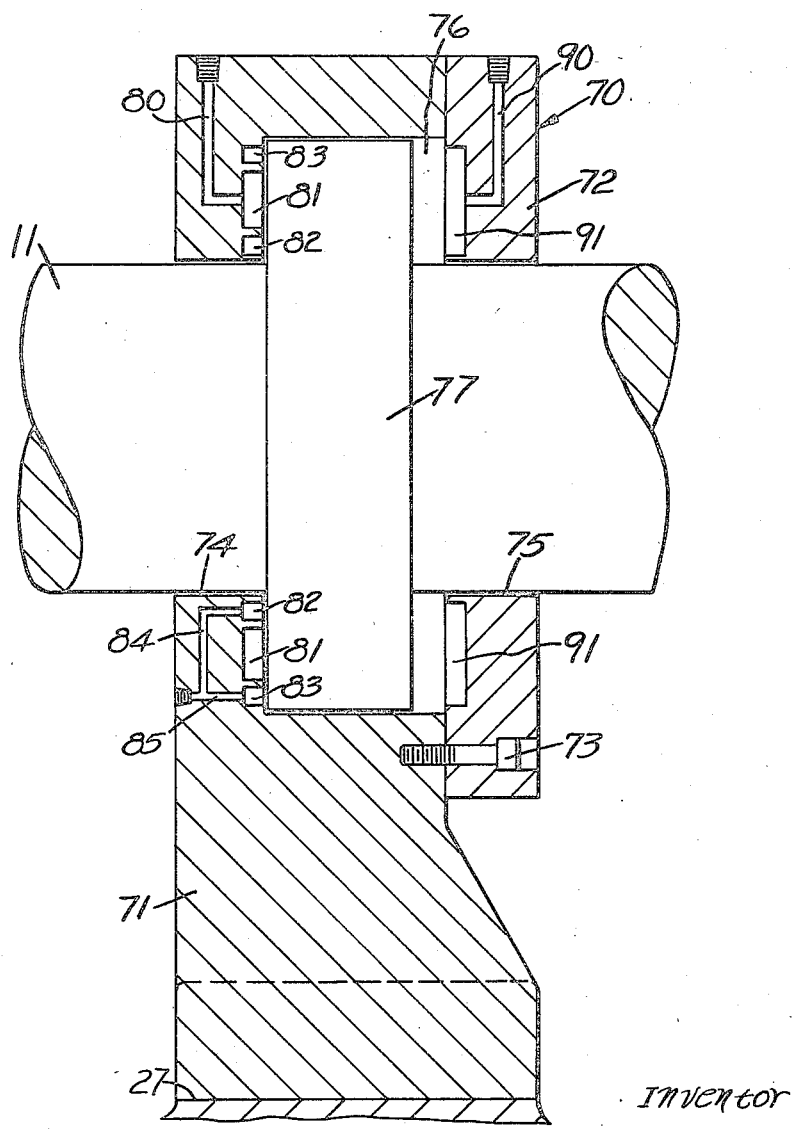
Figure 4:
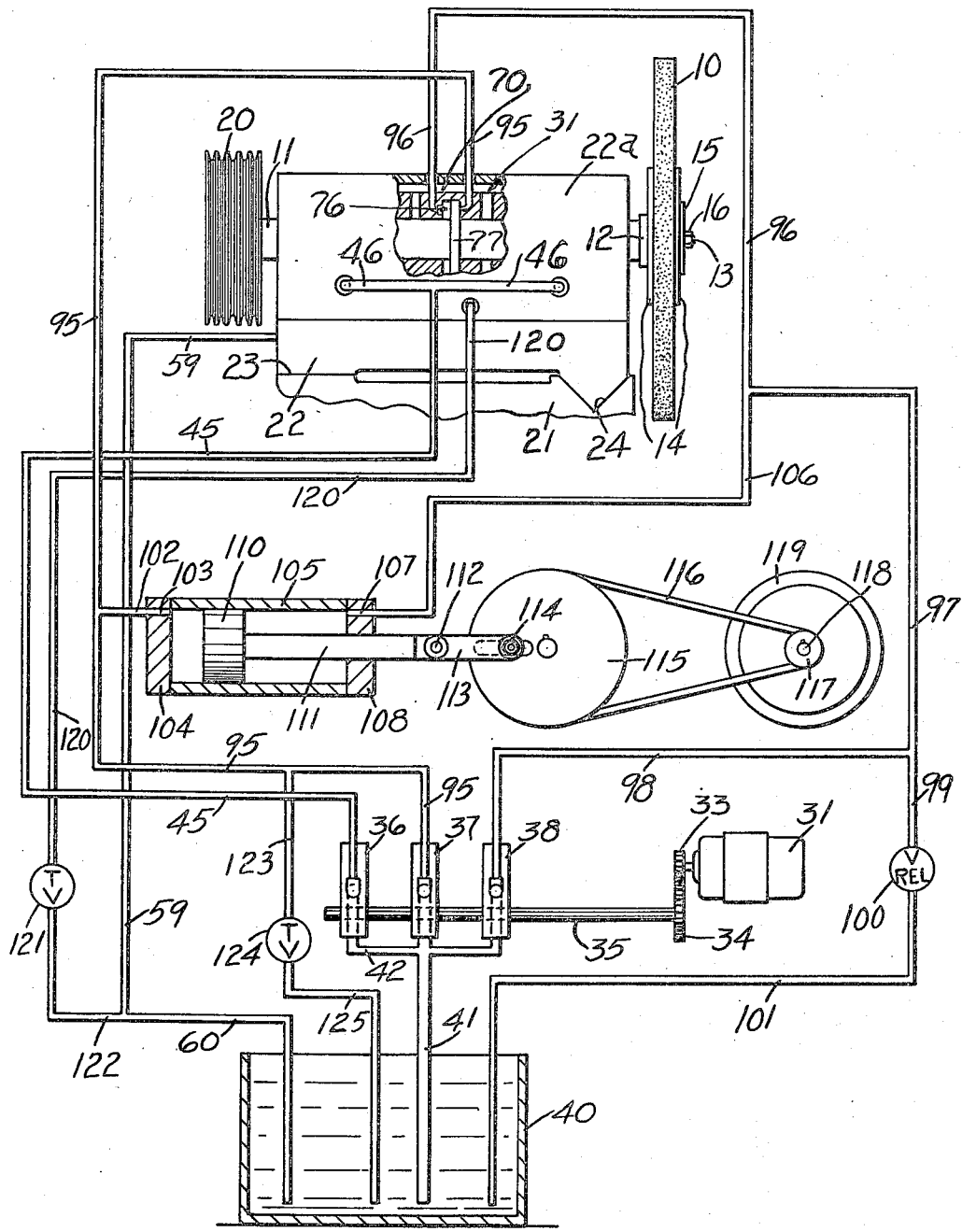

In the accompanying drawings illustrating two of many possible embodiments of the features of this invention, Figure 1 is a vertical sectional view taken at the axis of the wheel spindle of a grinder through the wheel head, Figure 2 is a cross-sectional view taken on the line 2—2 of Figure 1, Fig. 3 is an enlarged sectional view of the hydraulic thrust bearing and hydraulic reciprocator, the section plane being the same as that of Figure 1, Figure 4 is an hydraulic diagram, Figure 5 is another hydraulic diagram illustrating a modification of the invention, and those parts of the hydraulic system not illustrated in Figure 5 are to be deemed to be the same as shown in Figure 4.

Referring first to Figure 1, a cylindrical grinding machine has a grinding wheel 10 mounted on a spindle 11 by any suitable means such as a head 12 on the spindle, a threaded end 13 on the spindle, a pair of large plates or washers 14, a somewhat smaller washer 15 and a nut 16 on the threaded end 13.

At the end of the spindle 11 opposite the grinding wheel 10 is a pulley 20 driven by belts, not shown, driven by a smaller pulley, not shown, on the shaft of an electric motor likewise not shown. The manner of driving grinding wheel spindles is fully understood and therefore need not be illustrated.

The grinding machine usually provides some rigid support, which may be movable or adjustable in some cases, otherwise it may be part of the base herein indicated at 21. On this portion 21 is mounted a wheel slide 22 on a flatway 23 and V-ways 24. By the movement of the wheel slide 22 along ways 23 and 24 the grinding wheel is caused to approach and recede from the workpiece and by suitable mechanism is given a fine infeed toward the workpiece for grinding, all as well understood in the art. The requirements, therefore, of journal bearings for a wheel spindle are that the wheel spindle shall be held rigidly in a given axial position while rotating as otherwise the grinding machine cannot do precision work. Sometimes it is required that the grinding wheel remain fixed in position in the direction of the axis of the spindle while it is rotating and grinding whereas, for reasons well understood in the grinding art and which need not be elaborated here, it is frequently desired that the grinding wheel be reciprocated along its axis of revolution. It is a requirement for certain classes of grinders that the machine be adjustable so that the wheel, while rotating about a fixed axis, is stationary in the direction of the length of the axis, which can be shortly stated as not reciprocating, and that at other times the wheel be reciprocated in the direction of its axis while it is rotating. For good grinding results when a wheel is not reciprocating it should be fixed in position within very close limits.

Referring now to Figure 2, the upper part of the wheel slide 22, usually termed a wheel head 22a, is shown as having somewhat the shape of a box, that is to say it has two upstanding wall portions 25 and 26, an inside flat bottom 27, and a removable cover plate 28, leaving a generally rectangular parallelepipedal space 29 in the wheel head 22a for the reception of the spindle bearings and through which the spindle 11 extends. In the space 29 and secured to the bottom 27 by means of bolts 30 I place two bearing units 31 of the Brune Pietro type, that is to say they can be substantially the same as illustrated in the aforesaid Italian Patent No. 244,539.

Referring now to Figure 4, an electric motor 32 has a pinion gear 33 on the armature shaft thereof, and the pinion gear 33 meshes with a gear 34 on a shaft 35 which drives a series of pumps 36, 37 and 38. These are preferably constant displacement pumps, for example they may be conventional gear pumps such as are frequently employed in hydraulically actuated or controlled machine tools. A sump 40 which may be in the base of the grinder constitutes a tank for holding hydraulic fluid such as oil. A pipe 41 extends into the sump 40 and has a branch 42 leading to the inlet of the pump 36. The pumps 36, 37 and 38 are seen edgewise with the inlets on the back and the outlets on the front.

The outlet of the pump 36 is connected by a pipe 45 to branch pipes 46 each of which is connected to an inlet channel 47 of a Pietro unit 31. Referring now to Figure 2, the inlet chamber 47 is connected by passages 48 to three pressure chambers 50. In the passages 48 are valves 51 which can be adjusted by turning boltheads 52 thereon, one of these being shown in Figure 1.

The pressure chambers 50 are separated by and spaced from exhaust chambers 55 which are connected to exhaust channels 56, one for each Pietro unit, and the exhaust channels 56 are connected by exhaust ports 57 to an exhaust duct 58 which is connected to an exhaust pipe 59 which is connected to another exhaust pipe 60 extending into the sump 40.

The actual constructional details of the Pietro units 31 are shown in Figures 1 and 2 and conveniently the units may be made in two parts 61 and 62 bolted together by bolts 63. Between the pressure chambers 50 and the exhaust chambers 55 there are what can perhaps best be called bearing wall portions 65 which are like unto the bearing surface of an ordinary solid bearing in that they have bores concentric with the journal portions 66 of the spindle 11. There is a clearance between the bearing wall portions 65 and the journal portions 66 such that no mechanical contact between them is ever made, but the clearance is so small that the oil in the pressure chambers 50 is maintained at high pressure because it can only escape circumferentially between the portions 65 and 66 and also in an axial direction into the chambers 55 and channels 56 respectively. Figure 1 illustrates end walls 67 bounding the chambers 50 so that oil or other hydraulic fluid cannot escape from the chambers 50 except past the clearances which are small. When it is considered that the pump 36 is continuously pumping oil which has to go somewhere, it will be understood that considerable pressure can be maintained in the chambers 50. The pump 36 is provided with no relief valve and is consequently a constant displacement pump.

Should a journal 66 approach a particular chamber 50 more closely than the others, as by reason of the pressure on the grinding wheel 10 or on the pulley 20 or a resultant force due to such pressures, the pressure in the particular chamber 50 towards which the journal 66 starts to move is immediately increased thus reestablishing the balance of forces to hold the journals 66 and the spindle 11 in fixed axial position within the limits of a few ten thousandths of an inch. It is however pointed out that the disclosure of these Pietro units is to be considered diagrammatic to this extent; the units would give results of greater precision if there were a separate pump 36 with separate supply pipes and a separate inlet chanel for each one of the chambers 50. However the valves 51 are adjustable resistances giving partially the effect of having separate pumps 36. Another respect in which the illustration of the Pietro units is to be considered diagrammatic is that the action of these hydraulic journal bearing units could be made still more accurate, that is to give still greater precision results, if there were more than three chambers. Carrying these changes into effect now that they have been explained would involve nothing more than the ordinary skill of the art and since the Pietro units per se are not my invention I do not deem it necessary to provide elaborate drawings of improved species thereof.

Referring now to Figures 1 and 3, I provide a thrust bearing and reciprocating unit 70 in the wheel head 22a suitably secured by any means, not shown, to the inside flat bottom 27. This unit 70 may, as shown in Figure 3, comprise a large casting 71 and a plate 72 secured to the large casting 71 by means of bolts 73. In the large casting 71 is an interior cylindrical surface 74 spaced from the spindle 11 by only a very small clearance, and in the plate 72 is an interior cylindrical surface 75 likewise spaced from the spindle 11 by only a very small clearance.

In the large casting 71 is a cylindrical recess 76 in which is located a cylindrical enlargement 77 of the spindle 11, preferably integral therewith. There is only a very small clearance between the recess 76 and the enlargement 77 radially, but axially the recess 76 is considerably longer than the enlargement 77 as well shown in Figures 1 and 3.

A channel 80 in the casting 71 conducts oil or other hydraulic fluid under pressure to an annular chamber 81 formed in the radial surface of the casting 71 and communicating with the recess 76. This chamber 81 is a pressure chamber. A pair of annular exhaust chambers 82 and 83 are located adjacent the chamber 81, the former of smaller diameter and inside of the chamber 81 and the latter of larger diameter and outside the chamber 81, and all three chambers 81, 82 and 83 are concentric with each other and with the axis of the spindle 11. These exhaust chambers 82 and 83 are connected to exhaust via channels 84 and 85 in the casting 71.

A channel 90 conducts oil or other hydraulic fluid under pressure to the recess 76 on that side of the enlargement 77 which is opposite the annular chambers 81, 82 and 83. There may be and preferably is a large annular chamber 91 in the plate 72 as shown into which the channel leads although in some cases this may be omitted. The enlargement 77 acts as a piston and the recess 76 functions as an hydraulic cylinder so that by controlling the pressures in a manner about to be described, the spindle 11 can be held axially in fixed position in the position shown in Figures 1 and 3 or, at will, it can be caused to reciprocate within the limits of movement of the enlargement 77 in the recess 76.

Figures 1 and 3 are views looking from the front of the machine, while Figure 4 so far as the wheel slide 22 and wheel head 22a are concerned is a view from the rear of the machine. Consequently whatever is to the right in Figure 1 is to the left in Figure 4 and with this explanation the drawings can be easily understood. The channel 80 is connected by a pipe 95 to the outlet of the pump 37 while the channel 90 is connected by a pipe 96 to a pipe 97 which is connected by a pipe 98 to the outlet of the pump 38. The pipes 97 and 98 are connected to a pipe 99 which is connected through an adjustable relief valve 100 to a pipe 101 which leads to the sump 40. The pipe 95 is connected by a branch pipe 102 to a channel 103 in a cylinder head 104 on the end of an hydraulic cylinder 105. The pipes 96 and 97 are connected by a branch pipe 106 to a channel 107 in another cylinder head 108 of the cylinder 105. Thus the pipes 95 and 96 are connected to opposite ends of the cylinder 105.

In the cylinder 105 is a piston 110 on the end of a piston rod 111 which is connected by a connecting pin 112 to a connecting rod 113 which is connected to an adjustable crankpin 114 on a pulley 115 driven by one or more belts 116 which are driven by a small pulley 117 on the armature shaft 118 of a motor 119.

The channels 84 and 85 are connected by a pipe 120 to a throttle valve 121 which is connected by a pipe 122 to the exhaust pipe 60. The pipe 95 is connected by a pipe 123 to a throttle valve 124 which can also function as a shut-off valve and which is connected by an exhaust pipe 125 to the sump 40. The pump 37 should have greater capacity than the pump 38, for example it ought to pump about twice the amount of fluid. To achieve this result it might be twice as wide as the pump 38 and in this connection it is to be understood that Figure 4 is diagrammatic.

In operation the Pietro units 31 hold the shaft 11 centered in the manner already described. Hydraulically speaking these units are separate from the thrust bearing and reciprocating unit 70. With regard to the operation of the latter, let it first be considered that the motor 119 is deenergized and the piston 110 is stationary. There are many possible ways of causing the piston 110 to remain stationary; if the piston rod 111 and the connecting rod 113 are on dead center as shown the fluid under pressure will not move the piston 110. The pump 38 is sending constant pressure to the cylindrical recess 76 due to the fact that the adjustable relief valve 100 is in shunt relationship with the pipes 96, 97 and 98. With the right hand area of the piston 77 under a constant pressure the spindle 11 is urged to the left, Figure 3, and assuming now the piston 77 is well spaced from the chambers 81, 82 and 83, the fluid pumped by the pump 37 can so readily escape through the chambers 82 and 83, the channels 84 and 85, the pipe 120 to the sump 40 that the piston 77 must move to the left Figure 3. Of course the throttle valve 121 should not be closed too tight and naturally this valve can be adjusted until by actual measurements it is found the spindle 11 has moved sufficiently to the left or, better still, that the spindle has found a fixed position of stability. It will be seen that, when the piston 77 comes to about the position shown in Figure 3, the resistance to exhaust of the fluid from the annular chamber 81 is greatly increased and it will be noted that the pump 37 has no relief valve. This rise of pressure on the left of the piston 77 will finally balance the forces so that the spindle 11 is held in a fixed position axially, and thus the hydraulic mechanism above described is a thrust bearing.

Let it now be assumed that the operator desires to have the spindle 11 reciprocate as is desirable for certain kinds of grinding operations. The operator has but to start the motor 119 and the spindle 11 will reciprocate. While the piston 110 is moving to the left, Figure 4, extra oil is being forced into the chamber 81 thus raising the pressure therein while at the same time oil is being drawn from the pipes 96 and 97 thus dropping the pressure on the right hand side of the piston 77, Figure 3. Inevitably, therefore, the piston 77 must move to the right, Figure 3. Eventually, however, the piston 110 will move to the right, Figure 4, and then the reverse happens; oil is drawn from the pipe 95 and at the same time the pressure is maintained in the recess 76 since additional oil is flowing into the pipe 97 although the pressure does not rise materially because the relief valve 100 can take care of the additional oil. However the pressure rises sharply again when the piston 77 substantially closes the exit from the chamber 81 and this stops the leftward movement of the piston 77 before metal to metal contact is made. To achieve this result, the various adjustable valves are adjusted until no metal to metal contact results and of course the travel of the piston 110 can also be adjusted.

However a modification which represents an improvement is shown in Figure 5. In this modification a check valve 102a allows fluid to be forced into the pipe 95 from the cylinder 105 but will not permit the fluid to be withdrawn from the pipe 95 by the pump 105; instead a pipe 126 connected to a check valve 127 connected to a pipe 128 connected to the pipe 60 causes the left hand side of the cylinder 105 to be filled by oil drawn from the sump 40. The piston 77 will still reciprocate but when using this modification the adjustments are a little easier to make.

The clearances provided in the apparatus depend upon a number of factors, for example the actual size of the parts and the requirements of precision. For grinding wheel spindles the radial clearances in the Pietro units should be under a thousandth of an inch and preferably no more than a few ten thousandths of an inch. This can be achieved if the Pietro units have the improved features hereinbefore mentioned. The radial clearance between the piston 77 and the cylinder 76 can be somewhat larger because some leakage of fluid to the left, Figure 3, will do no harm, and a clearance here of half a thousandth of an inch will usually be satisfactory.

It will be seen that the cylinder and piston unit 105—110 is a pump and that it alternately pumps extra hydraulic fluid into the cylinder 76 on one side of the piston 77 and withdraws it therefrom and furthermore that in the modification of Figure 5 it pumps extra hydraulic fluid into the pressure chamber 81 only when fluid is being withdrawn from the one side but that in the disclosure of Figure 4 it both pumps and withdraws fluid from the chamber 81, and that thus pulsations of hydraulic fluid pressure are created on both sides of the piston 77 and in opposite phases on the sides respectively. It will further be seen that the invention provides an hydraulic thrust bearing which, when the piston 110 is not reciprocating, is opposed by a constant pressure, the pump 38 with the valve 100 being in effect a constant pressure pump. Furthermore when the piston 110 is reciprocating, the average force urging the piston 77 to the left, Figure 3, is greater than the average force urging it to the right until the clearances between the chamber 81 and the chambers 82 and 83 are reduced to a small dimension which will usually be a fractional part of a thousandth of an inch. These chambers operate as hydraulic means to check the approach of the piston portion to one end of the cylinder. Various other mechanisms for producing the alternating pulsations of hydraulic pressure might be used.

It will thus be seen that there has been provided by this invention an hydraulic thrust bearing and reciprocator for shafts in which the various objects hereinbefore set forth together with many thoroughly practical advantages are successfully achieved. As various possible embodiments might be made of the mechanical and hydraulic features of the above invention and as many changes might be made in the embodiments above set forth, it is to be understood that all matter hereinabove set forth or shown in the accompanying drawings is to be interpreted as illustrative and not in a limiting sense.

I claim:

1. In apparatus of the class described, a spindle or shaft, means journalling said spindle or shaft for rotation about its axis, a piston mechanically connected to said shaft, a cylinder having end walls around said piston there being a clearance between said piston and said cylinder so that they do not touch each other, means operatively connected to the cylinder for supplying hydraulic fluid under pressure to the cylinder space on one side of said piston, a pressure chamber in the end wall of the cylinder on the other side, means operatively connected to the cylinder for supplying hydraulic fluid under pressure to said pressure chamber, at least one exhaust chamber in said end wall adjacent said pressure chamber whereby the piston is forced to near the end wall on said other side by the preponderance of the pressure on the one side due to the fluid being free to escape through the exhaust chamber on the other side until the piston restricts such escape whereupon the forces are balanced and the piston is held in position without mechanical contact, means operatively connected to the cylinder for pumping extra hydraulic fluid into said cylinder space and withdrawing it therefrom, and means operatively connected to the cylinder for pumping extra hydraulic fluid into said pressure chamber and withdrawing it therefrom, said pumping means being operable in opposite phase whereby to reciprocate the piston and also the spindle or shaft.

2. In apparatus of the class described, a spindle or shaft, means journalling said spindle or shaft for rotation about its axis, a piston mechanically connected to said shaft, a cylinder having end walls around said piston there being a clearance between said piston and said cylinder so that they do not touch each other, means operatively connected to the cylinder for supplying hydraulic fluid under pressure to the cylinder space on one side of said piston, a pressure chamber in the end wall of the cylinder on the other side, means operatively connected to the cylinder for supplying hydraulic fluid under pressure to said pressure chamber, at least one exhaust chamber in said end wall adjacent said pressure chamber, whereby the piston is forced to near the end wall on said other side by the preponderance of the pressure on the one side due to the fluid being free to escape through the exhaust chamber on the other side until the piston restricts such escape whereupon the forces are balanced and the piston is held in position without mechanical contact, means operatively connected to the cylinder for alternately pumping extra hydraulic fluid into said cylinder space and withdrawing it therefrom, and means operatively connected to the cylinder for alternately pumping extra hydraulic fluid into the pressure chamber and withdrawing it therefrom, said last two mentioned means being synchronized to pump to said cylinder space while withdrawing from the pressure chamber and vice versa whereby to reciprocate the piston and also the spindle or the shaft.

3. Apparatus of the class described comprising a shaft, a cylinder surrounding said shaft and through which said shaft extends, end walls for said cylinder through one of which said shaft extends with but slight clearance, a constant displacement pump and connections and having a pressure relief valve connected to one end of said cylinder, a pressure chamber in the other end wall of the cylinder, an exhaust chamber adjacent said pressure chamber, a constant displacement pump and connections connected in a fluid circuit including said pressure and exhaust chambers, a piston on the shaft in the cylinder but with a clearance between them radially, and an additional piston and cylinder unit the opposite ends of which are fluid connected severally to the aforesaid connections, whereby to reciprocate the shaft without mechanical contact therewith or with the piston thereon, said two first-named pumps being operable continuously and said additional piston and cylinder unit being operable at the wall of an operator.

4. In apparatus as claimed in claim 3 the combination with the parts and features therein specified, of a check valve in the connection between the additional cylinder and the pressure chamber set to prevent fluid from being drawn by said additional piston and cylinder unit from the pressure chamber, an additional connection from the additional cylinder at the end connected to said check valve running to a supply of fluid and a check valve in said additional connection set to allow fluid to be drawn into said additional cylinder.

5. In apparatus of the class described, a hollow cylinder, a shaft extending into said cylinder, a piston in said cylinder mechanically connected to said shaft, means including a pump and a connection therefor having a pressure relief valve operatively connected to the cylinder and being effective normally to create a constant pressure in one end of the cylinder, an hydraulic fluid pressure circuit connected to and including the other end of the cylinder for supplying pressure fluid to and exhausting pressure fluid from said other end and being adjusted normally to create in said other end of the cylinder an average pressure which is less than that obtaining in said one end of the cylinder, whereby the piston tends to move towards said other end, means including the piston face adjacent said other end for imparting a restriction to hydraulic fluid exhausting from said other end in response to the piston approaching its limit of travel thereinto, whereby to create a balancing pressure in said other end, and selectively operable additional pump means and connections therefor connected to the ends of the cylinder for creating pulsations of pressure in the ends of the cylinder alternately whereby to impart straight reciprocating motion to said piston.

6. In apparatus of the class described, a hollow cylinder having end walls, a shaft extending into said cylinder, a piston in said cylinder mechanically connected to said shaft, means including a pump and a connection therefor having a pressure relief valve operatively connected to the cylinder and being effective normally to create a constant pressure in one end of the cylinder, an hydraulic fluid pressure circuit connected to and including the other end of the cylinder for creating an average pressure in said other end which is less than the constant pressure in said one end whereby the piston tends to move toward said other end of the cylinder, said circuit including fluid inlet and exhaust passages in the end wall of said other end which are in open communication except when such communication is restricted by the piston in its movement into said other end under the greater pressure obtaining in said one end of the cylinder, whereby movement of the piston is checked as it approaches said end wall, and selectively operable additional pump means and connections therefor connected to the ends of the cylinder for creating pulsations of pressure in the ends of the cylinder alternately whereby to impart straight reciprocating motion to said piston.

7. Apparatus of the character described comprising a spindle or shaft, a cylinder having end walls, a piston in said cylinder affixed to said spindle or shaft, hydraulic means operatively connected to the ends of the cylinder for supplying pressure fluid alternately thereto, whereby positively to reciprocate the piston in said cylinder, and an hydraulic system operatively connected to the cylinder and being operative both independently of and concurrently with said hydraulic means, said hydraulic system including a pump and pressure relief means connected to one cylinder end and being normally operative to create a constant pressure therein, a pressure chamber in the end wall of the other end of the cylinder, a pump connected to said pressure chamber, an exhaust chamber adjacent said pressure chamber and being connected to an exhaust connection, and adjustable valve means operatively connected to said pump for regulating the pressure of the fluid which it supplies to said pressure chamber, said pressure and exhaust chambers opening into said other end of the cylinder and being arranged with respect to one another and the piston so that said piston controls communication therebetween when approaching its limit of travel towards said end wall, said hydraulic system when operating independently of said hydraulic means being effective to create a pressure differential in the cylinder ends causing the piston to tend to move towards said end wall, and when operating concurrently with said hydraulic means being effective to cushion the final approach movement of said piston towards said end wall.

8. Apparatus of the class described comprising a shaft mounted for rotary and reciprocatory movement, a pair of axially spaced journal portions on said shaft, hydraulic fluid pressure bearing means surrounding said journal portions and supporting said shaft for rotation without mechanical contact therewith, a piston portion on said shaft disposed intermediate said journal portions, a cylinder having substantially greater axial length than and surrounding said piston portion and being spaced therefrom by a small clearance, hydraulic means operatively connected to the ends of the cylinder for supplying pressure fluid alternately to the opposite sides of the piston portion, whereby positively to reciprocate the piston portion in the cylinder without mechanical contact therewith, means operatively connected to said hydraulic means for cutting same into and out of operation at will, and additional hydraulic means operable concurrently with and independently of said first hydraulic means, said additional hydraulic means including a pump means connected to each end of the cylinder for creating a pressure therein and an exhaust means connected to one end only of the cylinder, said exhaust means being positioned so as to be controlled by the piston portion upon the latter approaching its limit of travel into said end, said additional hydraulic means when operating independently of said first hydraulic means being effective to create a pressure differential in the ends of the cylinder causing the piston portion to tend to move towards said one end and, when operating concurrently with said first hydraulic means, being effective to cushion the movement of the piston portion into said one end.

9. In apparatus of the character described, a hollow cylinder, a shaft extending into said cylinder, a piston affixed to said shaft and contained within said cylinder, hydraulic means including a pump and a connection therefor having a pressure relief valve connected to one end of the cylinder for creating a constant pressure in said one end, pressure and exhaust chambers in the end wall of the other end of the cylinder, said chambers being concentrically arranged and opening into said cylinder and facing toward the adjacent face of the piston, and an hydraulic fluid circuit connected to and including said other end of the cylinder for supplying hydraulic fluid to and exhausting it from said other end, said circuit including pump means connected to said pressure chamber, an exhaust connection connected to said exhaust chamber, and adjustable valve means connected in said circuit for adjusting the pressure in said other end to a value below that in said one end whereby said piston normally tends to move towards said end wall to a position in which said piston effects a restriction to the flow of pressure between said pressure and exhaust chambers and a consequent increase of pressure in said other end to a value balancing the pressure in said one end.

10. Apparatus of the class described comprising a shaft, a cylinder surrounding said shaft and through which said shaft extends, end walls for said cylinder through one of which said shaft extends with but slight clearance, a grinding wheel on said shaft outside of said end walls, a constant displacement pump and connections having a pressure relief valve connected to one end of said cylinder, a pressure chamber in the other end wall of the cylinder, an exhaust chamber adjacent said pressure chamber, a constant displacement pump and connections connected in a fluid circuit including said pressure and exhaust chambers, a piston on the shaft in the cylinder but with a clearance between them radially, an additional piston and cylinder unit the opposite ends of which are fluid connected severally to the aforesaid connections, whereby to reciprocate the shaft without mechanical contact therewith or with the piston thereon, a check valve in the connection between the additional cylinder and the pressure chamber set to prevent fluid from being drawn by said additional piston and cylinder unit from the pressure chamber, an additional connection from the additional cylinder at the end connected to said check valve running to a supply of fluid and a check valve in said additional connection set to allow fluid to be drawn into said additional cylinder, said two first named pumps being operable at the will of an operator.

GEORGE CROMPTON, Jr.

References Cited in the file of this patent

UNITED STATES PATENTS

| Number | Name | Date |
|---|---|---|
| 624,497 | Inglis | May 9, 1899 |
| 846,927 | Lasche | Mar. 12, 1907 |
| 1,731,482 | Ernst | Oct. 15, 1929 |
| 1,890,041 | McLeod | Dec. 6, 1932 |
| 2,246,461 | Cannon | June 17, 1941 |
| 2,350,117 | Kline | May 30, 1944 |

FOREIGN PATENTS

| Number | Country | Date |
|---|---|---|
| 23,503 | Great Britain | Oct. 24, 1911 |
| 244,539 | Italy | Jan. 30, 1926 |